Sept. 3, 1940.  W. L. McGRATH  2,213,446
PNEUMATIC SYSTEM
Filed Nov. 25, 1938

Inventor
William L. McGrath
By
George H Fisher
Attorney

Patented Sept. 3, 1940

2,213,446

UNITED STATES PATENT OFFICE 2,213,446

PNEUMATIC SYSTEM

William L. McGrath, St. Paul, Minn., assignor to Minneapolis - Honeywell Regulator Company, Minneapolis, Minn., a corporation of Delaware Application November 25, 1938, Serial No. 242,328

3 Claims. (Cl. 236—79)

My invention relates to fluid pressure systems and is particularly concerned but not entirely limited to pneumatic control systems employing a source of compressed air and condition responsive control instruments for adjusting the pressure in accordance with the condition and supplying the controlled pressure to pneumatically driven devices to be used as motive power therefor. In such systems a pneumatically driven device assumes a given position corresponding to the pressure impressed thereon as determined by the condition control instrument. In systems of this nature, a pneumatic relay may be used whereby a single control instrument may control the relay and the relay may in turn supply air at a controlled pressure to a number of pneumatically driven devices. These systems and analogous systems and the manner of employing the control instruments, relays, etc. are well known to those skilled in the art.

In systems of the type referred to, it is frequently necessary to check the pressures therein for the purpose of adjusting and/or calibrating the instruments and for other purposes. Thus it may be necessary to measure the pressure at a point beyond the instrument and check it against the value of the condition being controlled in order to ascertain the accuracy of the instrument in performing its control function. Similarly, it may be necessary to measure the pressure being supplied to a pneumatically driven device for purposes of checking the position of the device against this pressure. In the past this has been done by manually adjusting the thermostat so as to supply a given pressure and then checking the position of the pneumatically driven device accordingly. When the thermostat was located at a distance from the devices being controlled, this resulted in a great deal of inconvenience in having to adjust and readjust the thermostat and to go back and forth between the thermostat and the device. My invention has among its objects to obviate these various difficulties and inconveniences as well as to eliminate the necessity as has been done in the past of breaking pipe connections and installing pressure gauges either permanently or temporarily for the purposes of making the necessary pressure checks. Obviously, the procedure followed in the past as outlined was time consuming, costly, and inconvenient and, moreover, in the case of permanent gauges a more or less unsightly appearance was present particularly when a gauge was installed on or adjacent a room thermostat, for example.

Another object of my invention is to provide a pressure control device having an inexpensive and unobjectionable fitting whereby pressure may be conveniently checked without breaking pipe connections and without resorting to installation of the permanent gauge.

Another object is to provide an improved method and means of adapting a pneumatic control system for instantly checking the pressure at various points therein in an inexpensive and convenient manner.

Another object is to provide in combination with a system of the class referred to above a testing unit in the form of a gauge having an adapter unit arranged to be applied to fittings in the system for checking the pressure, the adapter member embodying a manually adjustable bleed valve for bleeding off pressure so that the pressure being measured by the gauge can be adjusted to any desired value and the position of the pneumatically driven device then checked in accordance with the gauge reading. In employing this device in a system, I may use the test unit on a pressure fitting which is located on or adjacent to the pneumatically driven device so that adjustment and readjustment of the thermostat as referred to above is eliminated. The operative may make a check upon the operation of the pneumatically driven device entirely independently of the thermostat or other pneumatic control instruments.

While I have chosen a particular type of instrument and system for illustrating one embodiment of my invention, it is not to be restricted to this particular disclosure inasmuch as it is equally applicable to various types and forms of instruments and systems.

Figure 1:
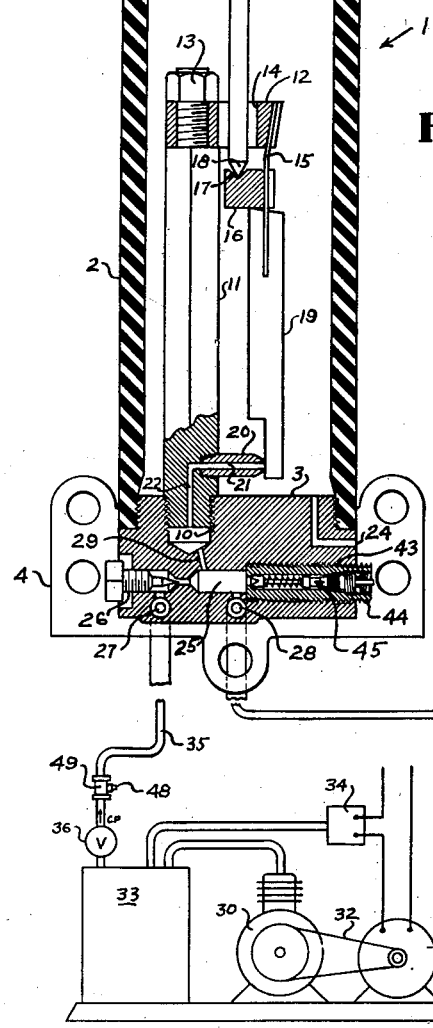
Figure 1 represents a pneumatic thermostat showing diagrammatically the manner of connecting the thermostat in a pneumatic system, the thermostat and system having the substance of my invention incorporated therein in part.

Referring to Figure 1 of the drawing which shows a pneumatic control system, numeral 1 indicates generally a pneumatic thermostat which may take the form of pneumatic thermostats well known in the art, with the exception of my particular improvements which I will distinctly point out. The thermostat comprises a cylindrical tube-like portion 2 which is secured in screw threaded relation to a metal base 3. The base 3 has an integral bracket 4 which is suitably perforated for purposes of securing the thermostat to a wall plate or the like for supporting it. The tube 2 is made of rubber or other similar material which expands and contracts in accordance with temperature as I will presently point out, and the upper end of the tube is closed by a suitable cap or cover member assembly indicated at 5. Numeral 6 indicates a stem or rod the upper end of which abuts an adjusting screw 7 whereby the stem 6 may be adjusted longitudinally with respect to the tube. Secured to the stem 6 in any suitable manner is a disc 8 which forms a guide for the stem 6 within the tube 2 of the thermostat.

The base 3 has a tapped screw threaded opening at 10 into which is screwed the extremity of an upright standard or support 11 which is preferably made of substantially inexpansible material. The support 11 may have a polygonal cross-section, its upper end being circular and screw threaded and having a bracket member 12 secured thereto by means of a nut 13. Bracket member 12 has an opening 14 through which the stem 6 extends and at its end bracket 12 carries a resilient blade 15 which is fastened to the bracket 12 in any suitable manner. The blade or strip 15 supports a metal block 16 having a recess at 17 in which is engaged a conical point 18 at the lower end of the stem 6. The lower end of the blade 15 supports a lever 19 adjacent block 16, the blade 15 being secured in a slot in the lever.

Numeral 20 indicates a nozzle having a port 21 extending longitudinally therein, the nozzle being screw threaded into a suitable tapped opening in the lower part of the support 11. The port 21 communicates with a longitudinal port 22 within the support 11 which extends to the lower screw threaded end of the support 11. The lower end of the lever 19 is disposed adjacent to nozzle 20 and, as will presently appear, controls the flow of air through the port 21 which forms a bleed port. From the foregoing it should be apparent that expansion and contraction of the tube 2 in response to temperature will cause longitudinal movement of the stem 6 with respect to the support 11 whereby the block 16 will cause the blade 15 to be moved to the right or left with respect to its point of support on the bracket 12. At the same time, of course, the lever 19 will be moved similarly and the proximity of its lower end with respect to the nozzle 20 will be adjusted.

The base 3 of the thermostat has a horizontal channel 25 therein and communicating with this channel through a needle valve 26 is a passage 27 which extends rearwardly to the rear face of base member 3. A second passage 28 similar to the passage 27 communicates directly with the channel 25 as shown. The channel 25 is connected with the tapped opening 10 previously described by a port 29. A port 24 in base 3 provides a vent for air from within tube 2. The structure of the thermostat so far described is conventional and well known in the art and I will presently point out the improvements constituting my invention.

Numeral 30 represents a compressor driven by an electric motor 31 through a belt 32 for producing a supply of compressed air for use in the system. The compressor 30 discharges into a receiver 33 and communicating with the receiver 33 is a pressure operated switch 34 which is connected in series with the electric motor as shown. The pressure switch 34 operates automatically to maintain a substantially constant predetermined pressure within the receiver 33. Numeral 35 indicates a supply pipe leading from the receiver 33 through a pressure regulator 36 and which may be connected to the passage 27 in the base of the thermostat in a manner well understood in the art. The pressure regulator 36 is a device well known in the art and in my particular disclosure operates to maintain a constant pressure of 15 lbs. per square inch, for example, in the supply conduit 35. As will be obvious to those skilled in the art, air from the conduit 35 passes through the restriction formed by the needle valve 26 into the channel 25 and through the port 29 leading to the bleed port 21. Pressure in the channel 25 will be determined by the position of the lower end of lever 19 with respect to the nozzle 20 inasmuch as this regulates the rate of air bled through the port 20 in the manner pointed out above. This controlled pressure in the channel 25 may be communicated to a valve or similar device 37 through a conduit 38 which is connected to the passage 28. For purposes of illustration I have shown the valve 37 as comprising a pneumatically driven valve having a motor formed by an expansible bellows 51 disposed within a chamber 39. The interior of the bellows is connected to a valve stem 40 carrying a valve member 41 and the valve stem is biased in opening direction by a coil spring 42. Pressure within the chamber 39 tends to compress the bellows 51 and obviously the position of the valve member 41 with respect to its seat will be determined by the pressure within the chamber 39 and conduit 38.

Figure 2:
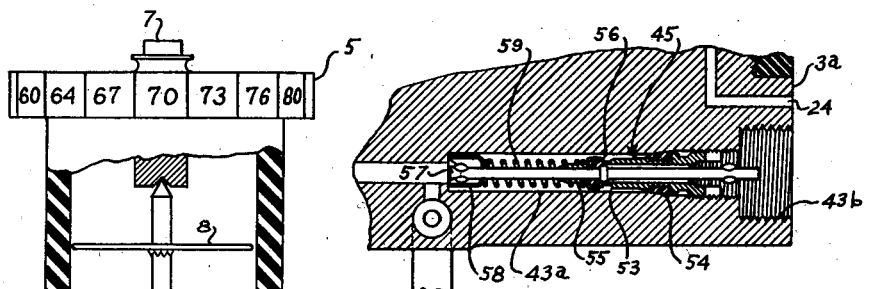
Figure 2 is a partial view of a slight modification of the lower part of the thermostat of Figure 1 and showing the valve of Figure 1 in detail.

The structure so far described operates in a manner which is obvious and which is well understood by those skilled in the art, that is, the thermostat regulates the pressure within the channel 25 and valve chamber 39, and the valve is positioned correspondingly to the temperature affecting the thermostat. Now in this particular type of system, at times when it is necessary or desirable to check the adjustment or calibration of the thermostat or to readjust or recalibrate the instrument or for other reasons determine the pressure on the system, it is necessary to measure the pressure in the channel 25 or within the valve chamber 39. In order to facilitate taking these pressure readings, I provide an opening 43 in the base of the thermostat which communicates with the channel 25. This opening 43 is provided with screw threads and engaged therein is a screw threaded nipple 44. The interior of the nipple 44 is arranged so as to receive in screw threaded relation therewith a valve 45. The details of the valve 45 are more clearly visible in Figure 2 and referring to this figure, numeral 53 indicates a throat or body portion of the valve which is screw-threaded as shown so as to engage with the interior of an opening 43a in the base portion of the thermostat. The throat 53 has an annular recess in which is disposed an annularly shaped ring of resilient material 54 which provides for air tight engagement between the valve and the inner walls of the opening 43a. The left end of the throat 53 forms a valve seat and cooperating with this seat is a valve member 55 comprising a metal retainer for an annularly shaped seating member 56 which may be made of any suitable material. A valve stem 57 extends entirely through the throat 53 and the valve 55 and is suitably secured to the valve 55. At the left end of the stem 57 is a spring retaining element 58 which is loosely carried on the stem and which abuts the inner end of the opening 43a. Interposed between the spring retaining element 58 and the valve 55 is a coiled compression spring 59 which urges the valve 55 towards its seat. The opposite end of the valve stem extends beyond the screw-threaded part of the throat 53 so that by forcing the stem inwardly the valve may be unseated against the force of spring 59 in a manner with which those skilled in the art are familiar. The stem 57 may be crimped at points adjacent each end as shown so as to provide stops to limit the travel of the stem when reciprocated in either direction. No novelty is claimed for the construction of valve 45, as valves of this type are well known in the art and in extensive use. The valve 45 is installed in the nipple 44 of Figure 1 in the same manner as within the opening 43a in Figure 2. In Figure 1, the outer end of the valve stem extends beyond the end of the nipple 44 as shown.

Figure 3:
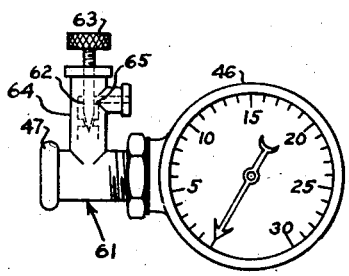
Figure 3 is a pressure gauge having an adapter unit of the particular construction of my invention.

In Figure 3 I have represented a pressure gauge 46 and this gauge itself may be of any suitable conventional type and with this gauge I use an adapter member 61 of a particular and novel construction which cooperates in the accomplishment of the results gained by my invention. The adapter member 61 of course has a passage therethrough for communicating pressure to the gauge and has an end portion 47 which is adapted to be applied to and can so engage with the nipple 44, for example, so as to cause the valve 45 to be opened to permit pressure to pass into the adapter member 61. The member 61 has an integral portion 64 through which is a passage 65 for bleeding pressure from the channel through the main portion of the member 61 and this passage is controlled by a manually adjustable needle valve 63. The manner in which I use the unit of Figure 3 will be referred to later.

It should be understood that the supply conduit 35 may have branches leading to different control instruments in various parts of the building, for example. In order to check the constancy of the pressure within the supply conduit 35, I have provided a suitable fitting 49 having a nipple 48 corresponding to the nipple 44. The nipple 48 may be screw threaded into a suitable boss integrally formed on the fitting 49 with a valve corresponding to the valve 45 within the nipple, the valve communicating with the passage through the fitting. In checking the pressure in the channel 25 or in the pipe 35, it is only necessary to apply the member 47 of the pressure gauge testing unit to the nipples 44 or 48 so as to take a reading. Normally when checking these pressures, the manually adjustable needle valve 63 will be left in closed position. However, when it is desired to check the positions of the valve 37 to determine the accuracy of its operation, the member 47 is applied to the nipple 50 and by then adjusting the needle valve 63 to a desired opening, additional air can be bled off so as to produce any desired pressure within the conduit 38 in which pressure would always be registered by the gauge. The position taken by the valve can then be checked against the pressure registered by the gauge. Obviously, this facilitates to a great extent the process of checking the valve inasmuch as the operative making the test need only apply the gauge testing unit to the nipple and adjust the needle valve for any desired pressure while at the same time checking the position of the valve. The need of adjusting the thermostat to produce a certain pressure in the conduit 38 for checking purposes is obviated.

While I have disclosed a thermostat of the two pipe type, my invention may be applied to that type of thermostat employing a single pipe equally as well. For example, if the valve 37 is to be employed at a point which may be in the basement and perhaps adjacent to the compressor apparatus, the restriction formed by the needle valve 26 may be located in a suitable fitting at a point more or less adjacent to the compressor apparatus and the conduit 38 may then be connected to the conduit 35 at a point beyond the restriction formed by the needle valve.

Referring again to Figure 2, I have shown a portion of the base of a thermostat indicated at 3a in a slightly modified form. In this figure, I have shown the base portion 3a having an opening 43a which is of a size to accommodate the valve core 45 without the need of a nipple. The opening or bore 43a communicates with a counterbore 43b formed adjacent the exterior of the base 3a. The purpose of the counterbore 43b is to accommodate pressure gauges having an adapter member comprising a screw-threaded nipple which may be screwed into the counterbore 43b. At times when it is desired to check the pressure, a suitable block may be screwed into the counterbore 43b if desired.

From the foregoing, it should be apparent that I have provided a novel method and system for checking the system in a system of the type described in a very quick, convenient, and efficient manner. In practicing my invention, a preexisting system may be adapted in a manner whereby the advantageous results of my invention are secured by the use of elbows or other fittings corresponding to the fitting 49, the fittings embodying the valve as described in connection with the description of the fitting 49. Also, the system may be tapped at desired points and a valve inserted in the manner shown and described in connection with Figure 2. Obviously, this is a very inexpensive procedure and the cost of materials is practically negligible. The advantages by practicing my invention are substantial inasmuch as permanently installed pressure gauges are done away with and I may quickly check the pressure at any point by merely employing a portable pressure gauge thereto. The time consumed by service men in checking and testing systems of the class described is materially reduced particularly by reason of the novel pressure gauge testing unit which I have devised. The fittings which are necessary for purposes of making the pressure checks in a manner described are so small as to be practically unnoticeable and, furthermore, they may be adequately concealed and protected.

The embodiments of my invention which I have disclosed are intended to be illustrative only and the scope of the invention is to be determined only by the appended claims.

I claim as my invention:

1. In a pneumatic control system, in combination, a source of air pressure, a condition responsive pneumatic control instrument supplied with air pressure from said source, said instrument being operable to supply pressure at a value which is a function of the condition to which the instrument is responsive, a pressure operated device supplied with air at regulated pressure from said instrument, means comprising a normally closed valve communicable with pressure regulated by said instrument and located adjacent said device, and a testing unit comprising a pressure gauge having an adapter member adapted to be applied to said means for opening said valve and communicating pressure to said gauge to be measured thereby, said adapter unit embodying a manually adjustable bleed valve for bleeding off air whereby the pressure of the supply to said device can be manually adjusted to a value indicated by the gauge and the position of the device checked in accordance therewith.

2. In apparatus of the character described, in combination, a pressure system comprising a source of fluid pressure supply, and a device for reducing the pressure in said system, means conveying reduced pressure from said device, means responsive to said pressure and operable to assume variable positions in accordance therewith, means comprising a normally closed valve communicating with said pressure, a testing unit comprising a pressure gauge having an adapter member adapted to be applied to said valve means for opening said valve and communicating pressure to said gauge to be measured thereby, said adapter member embodying a manually adjustable valve for bleeding off pressure being conveyed from said device to said gauge whereby said pressure may be adjusted to a desired value and the position of said device checked in accordance therewith.

3. In a pneumatic control system, in combination, a source of air pressure, a condition responsive pneumatic control instrument supplied with air pressure from said source, said instrument being operable to supply pressure at a value which is a function of the condition to which the instrument is responsive, a pressure operated device supplied with air at regulated pressure from said instrument, means comprising a normally closed valve communicable with pressure regulated by said instrument, and means comprising a pressure gauge and a manually adjustable reducing valve communicating with pressure supplied by said instrument, said reducing valve being operative to bleed off air so as to adjust the pressure to a desired value as registered by said gauge whereby the position of said pressure operated device may be checked with said gauge.

WILLIAM L. McGRATH.